United States Patent
Kampfl et al.

(10) Patent No.: US 12,551,831 B2
(45) Date of Patent: Feb. 17, 2026

(54) FILTER UNIT FOR A COMPRESSOR

(71) Applicant: BAUER KOMPRESSOREN GmbH, Munich (DE)

(72) Inventors: Robert Kampfl, Munich (DE); Johannes Huber, Friedberg (DE)

(73) Assignee: BAUER KOMPRESSOREN GMBH, Munich (DE)

( * ) Notice: Subject to any disclaimer, the term of this patent is extended or adjusted under 35 U.S.C. 154(b) by 596 days.

(21) Appl. No.: 17/907,128

(22) PCT Filed: Mar. 19, 2021

(86) PCT No.: PCT/EP2021/057107
§ 371 (c)(1),
(2) Date: Sep. 23, 2022

(87) PCT Pub. No.: WO2021/191081
PCT Pub. Date: Sep. 30, 2021

(65) Prior Publication Data
US 2023/0106998 A1  Apr. 6, 2023

(30) Foreign Application Priority Data
Mar. 24, 2020 (DE) ............ 10 2020 203 755.8

(51) Int. Cl.
*B01D 46/00* (2022.01)
*A61L 9/20* (2006.01)
(Continued)

(52) U.S. Cl.
CPC .......... *B01D 46/0028* (2013.01); *A61L 9/20* (2013.01); *B01D 46/0002* (2013.01);
(Continued)

(58) Field of Classification Search
CPC ............ B01D 46/0028; B01D 46/0002; B01D 46/0084; B01D 46/24; B01D 46/446;
(Continued)

(56) References Cited

U.S. PATENT DOCUMENTS 4,954,465 A * 9/1990 Kawashima ....... B01D 53/8668
502/182
5,330,722 A * 7/1994 Pick .......................... A61L 9/16
250/492.1
(Continued)

FOREIGN PATENT DOCUMENTS

CN    209 838 649 U    12/2019
JP    H0223278 A       1/1990
(Continued)

OTHER PUBLICATIONS

International Search Report issued in PCT/EP2021/057107 dated May 31, 2021, 4 pages.

*Primary Examiner* — Dung H Bui
(74) *Attorney, Agent, or Firm* — Rothwell, Figg, Ernst & Manbeck, P.C.

(57) ABSTRACT

The present invention relates to a filter unit (10) for a compressor, comprising a housing (12) with an inlet (14) and an outlet (28) for gas to be compressed, a particle pre-filter (16) arranged downstream of the inlet (14) in the flow direction of the gas to be compressed, an ultraviolet irradiation unit (22) which is configured to emit ultraviolet light and is arranged downstream of the particle pre-filter (16) in the flow direction of the gas to be compressed, and a ballast (40) which is configured and arranged to control the ultraviolet irradiation unit (22). The filter unit (10) is designed in such a way that the gas to be compressed which is fed in at the inlet (14) first passes through the particle pre-filter (16), is then irradiated by the ultraviolet irradiation unit (22) and can finally be fed to the compressor through the outlet (28).

(Continued)

The invention also relates to a compressor comprising such a filter unit (10) and to a method for compressing breathing air using such a compressor.

20 Claims, 2 Drawing Sheets

(51) Int. Cl.
    *B01D 46/24*     (2006.01)
    *B01D 46/44*     (2006.01)
    *F04B 25/00*     (2006.01)
    *F04B 39/16*     (2006.01)

(52) U.S. Cl.
    CPC ......... *B01D 46/0084* (2013.01); *B01D 46/24* (2013.01); *B01D 46/446* (2013.01); *F04B 25/00* (2013.01); *F04B 39/16* (2013.01); *A61L 2209/111* (2013.01); *A61L 2209/12* (2013.01); *A61L 2209/14* (2013.01); *A61L 2209/15* (2013.01); *B01D 2279/65* (2013.01)

(58) Field of Classification Search
    CPC ... B01D 2279/65; B01D 46/0027; A61L 9/20; A61L 2209/111; A61L 2209/12; A61L 2209/14; A61L 2209/15; F04B 25/00; F04B 39/16; F04B 49/02; F04B 49/06
    See application file for complete search history.

(56) References Cited

U.S. PATENT DOCUMENTS

| | | | |
|---|---|---|---|
| 6,818,177 B1* | 11/2004 | Turcotte | F24F 8/192 250/435 |
| 10,421,670 B1* | 9/2019 | Wilkie | A61L 2/0017 |
| 11,007,292 B1* | 5/2021 | Grenon | F21V 11/08 |
| 2002/0174674 A1* | 11/2002 | Takahashi | A61L 9/20 62/264 |
| 2004/0265193 A1* | 12/2004 | Panice | H05B 3/0085 422/186.04 |
| 2005/0211415 A1* | 9/2005 | Arts | B01D 46/62 165/59 |
| 2006/0018805 A1* | 1/2006 | Yuen | A61L 9/22 422/121 |
| 2011/0286859 A1* | 11/2011 | Ortiz | F04B 49/002 417/20 |
| 2012/0085927 A1* | 4/2012 | Maeng | F24F 1/005 250/454.11 |
| 2012/0189467 A1* | 7/2012 | Allenspach | F04B 49/246 417/279 |
| 2012/0207577 A1* | 8/2012 | Stollery | A61L 2/18 414/792.9 |
| 2012/0222649 A1* | 9/2012 | Kudoh | B05B 7/0491 261/76 |
| 2013/0015753 A1* | 1/2013 | Son | F25D 27/005 312/236 |
| 2014/0261795 A1* | 9/2014 | Durant | F16K 37/0091 137/557 |
| 2016/0214076 A1* | 7/2016 | Kiremitci | C02F 1/325 |
| 2017/0100989 A1* | 4/2017 | Chapaton | B60H 3/0085 |
| 2017/0241691 A1* | 8/2017 | Yamakawa | H02P 27/06 |
| 2017/0304472 A1* | 10/2017 | Neister | A23B 7/015 |
| 2018/0001738 A1* | 1/2018 | Vehr | B60H 1/3216 |
| 2018/0202442 A1* | 7/2018 | Nakamoto | H02P 6/30 |
| 2019/0001250 A1* | 1/2019 | Moredock | B01D 46/446 |
| 2019/0390588 A1* | 12/2019 | Inoue | F01N 9/002 |
| 2020/0032801 A1* | 1/2020 | Oguma | F04C 28/06 |
| 2020/0232453 A1* | 7/2020 | Hattori | F04B 49/06 |
| 2020/0238592 A1* | 7/2020 | Hayakawa | B29C 49/46 |
| 2020/0248681 A1* | 8/2020 | Sakai | F04C 18/0215 |
| 2020/0289686 A1* | 9/2020 | Janik | G01V 11/002 |
| 2021/0052758 A1* | 2/2021 | Brais | A61L 2/10 |
| 2021/0155080 A1* | 5/2021 | Hattori | F25B 49/025 |
| 2021/0186748 A1* | 6/2021 | Kirschman | A61F 7/0085 |
| 2021/0196851 A1* | 7/2021 | Khan | A61L 9/20 |
| 2021/0277885 A1* | 9/2021 | He | F24F 11/65 |
| 2021/0301812 A1* | 9/2021 | Li | F24F 11/64 |
| 2021/0339184 A1* | 11/2021 | Hourani | F24F 8/10 |
| 2021/0361815 A1* | 11/2021 | Krosney | A61L 9/20 |
| 2022/0016297 A1* | 1/2022 | Huang | A61L 2/10 |
| 2022/0049691 A1* | 2/2022 | Aoyagi | F04B 49/02 |
| 2022/0118952 A1* | 4/2022 | Gutowski | B60W 10/30 |
| 2022/0146130 A1* | 5/2022 | Kwon | A61L 9/046 |
| 2022/0193297 A1* | 6/2022 | Parmar | A61L 2/26 |
| 2022/0241712 A1* | 8/2022 | Iggander | B01D 46/521 |
| 2022/0243731 A1* | 8/2022 | Morita | F04B 39/06 |
| 2022/0316748 A1* | 10/2022 | Shizu | H02K 1/12 |
| 2023/0034599 A1* | 2/2023 | Kim | G05B 19/042 |
| 2023/0339296 A1* | 10/2023 | Bobryshev | B60H 3/0608 |

FOREIGN PATENT DOCUMENTS

| | | |
|---|---|---|
| JP | 3009261 U | 4/1995 |
| WO | 99/22 610 A2 | 5/1999 |
| WO | 9922610 A3 | 5/1999 |

\* cited by examiner

FILTER UNIT FOR A COMPRESSOR

This application is a 35 U.S.C. 371 National Phase Entry Application from PCT/EP2021/057107 filed Mar. 19, 2021, which claims priority to and the benefit of German Patent Application No. 10 2020 203 755.8, filed on Mar. 24, 2020, the disclosures of which are incorporated herein by reference in their entirety.

The present invention relates to a filter unit for a compressor, a compressor equipped with such a filter unit, and a method for compressing and bottling breathing air by means of such a compressor.

When gases and, in particular, breathing air are compressed and bottled, there are already strict regulations regarding the quality and maximum permissible contamination, such as the breathing air standard EN 12021:2014-07, according to which all pollutants must be less than one tenth of the national 8-hour exposure limit; however, recently there has also been a desire or need to inactivate any viruses that may be present in the gas to be compressed before the compression and bottling take place. It is therefore understood that in the context of the present description, the term "gas" should always also include gas mixtures.

According to the current state of knowledge, such inactivation of viruses is only possible using heat, pressure, suitable chemicals and UV radiation due to their structure and size.

When heat is used, a residence time of 8 minutes above 120° C. is required. Although such conditions could be created in the intake area of a compressor, the gas to be compressed would then have to be cooled again in a complex manner, since conventional compressors have a maximum intake temperature of about 45° C., which must not be exceeded.

On the other hand, the temperature in the compressor itself can sometimes be above 200° C., but the residence time of the gas in this state is usually only a few seconds, so that a reliable inactivation of viruses is not provided in this way. It should also be considered that heating up containers that are already under pressure results in an additional significant increase in pressure, so that the container could be destroyed as a result or would have to be designed for a higher pressure, which would lead to a significant increase in costs.

Finally, an increase in temperature before the container is filled would result in a significant drop in the pressure in the container to be filled after the gas has cooled, and therefore it would not be possible to store the intended amount of gas. Thus, there is no possibility at any point in the compression and bottling process of carrying out sufficient heating of the gas to be bottled in an efficient and economically viable manner.

Similarly, inactivation of viruses by means of pressure or chemicals cannot be implemented since, on the one hand, pressures of over 4000 bars would be necessary, which also cannot be achieved in an economically viable manner, and, on the other hand, the use of virucidal disinfectants is ruled out for many processes, in particular for compressing and bottling breathing air.

It is therefore the object of the present invention to provide a filter unit for a compressor by which viruses contained in the gas to be compressed can be inactivated in a reliable and efficient manner.

For this purpose, a filter unit according to the invention for a compressor comprises a housing with an inlet and an outlet for gas to be compressed, a particle pre-filter arranged downstream of the inlet in the flow direction of the gas to be compressed, an ultraviolet irradiation unit which is configured to emit ultraviolet light and is arranged downstream of the particle pre-filter in the flow direction of the gas to be compressed, and a ballast which is configured and arranged to control the ultraviolet irradiation unit. The filter unit is designed in such a way that gas to be compressed which is fed in at the inlet first passes through the particle pre-filter, is then irradiated by the ultraviolet irradiation unit and can finally be fed to the compressor through the outlet.

Consequently it is to the credit of the present inventors that they have recognized that the filter unit according to the invention can be used to free the gas of active viruses even before the gas is actually compressed, wherein the particle pre-filter protects the ultraviolet irradiation unit against contamination and an associated deterioration in its efficiency and the inactivation rate.

The ballast is in turn responsible for supplying the irradiation unit with electrical energy and, depending on the design, can be set up, for example, to supply an increased current during a switch-on process and then a substantially constant current.

Furthermore, the filter unit according to the invention is suitable for both mobile and stationary compressor systems, since it is installed in the intake line in the atmosphere. This also makes the unit according to the invention particularly suitable as a retrofit solution, since it can be operated completely independently and only requires its own power supply for the ballast and the irradiation unit. Furthermore, it should be noted that although this description primarily relates to the inactivation of viruses in the gas to be compressed, it is also possible to combat bacteria, spores, etc. effectively using the filter unit according to the invention.

In an advantageous embodiment, the housing of the filter unit according to the invention in the area of the ultraviolet irradiation unit can be made at least partially, preferably completely, of anodised aluminium, in particular on the inside. In contrast to stainless steel, for example, anodised aluminium has excellent reflection properties in the relevant ultraviolet wavelength range, which increases the efficiency of the irradiation, while the absorption of the radiation in stainless steel could also lead to an undesirable increased heating of the housing. In particular, the housing could be made at least in part from a type of aluminium tubing commonly used in high-volume gas cartridge manufacture. A cost-effective supply of this critical component is therefore ensured, and cartridge tubes, in particular with article numbers 61089, 62333 and 60174, can be used.

Furthermore, the housing can be elongate, in particular cylindrical, for example circular-cylindrical, in the region of the ultraviolet irradiation unit. This not only creates a suitable receiving space for the irradiation unit, which is usually also elongate, but also increases the residence time of the gas in the effective irradiation area and thus ensures the efficiency of the filter unit. Furthermore, a circular-cylindrical shape of the housing in the region of the ultraviolet irradiation unit ensures that a laminar gas stream is generated along the irradiation unit, in which the gas is always guided past at a well-defined distance. In addition, disadvantageous flow properties within the housing, which could be produced by undercuts or the like, are avoided.

A further measure to increase the efficiency of the unit according to the invention can consist of further configuring the ballast to adapt the control of the ultraviolet irradiation unit to an ambient temperature and/or a temperature of the gas to be compressed, which can be entered by a user using an input unit or can be detected by means of a suitably arranged sensor unit. This development is based on the fact that the inactivation rate is usually dependent on temperature, so that the ultraviolet irradiation unit must be designed to be at least powerful enough to still achieve the desired inactivation rate in the least effective temperature range. For example, at higher temperatures it could be regulated down in terms of its radiation power by the ballast. The input unit and/or sensor unit used may be any suitable known type of such units and may be arranged accordingly and operatively coupled to the ballast.

As a safety measure and to prevent insufficiently treated gas from being compressed and/or bottled in the event of a failure or other problem with the ultraviolet irradiation unit, the filter unit according to the invention can also comprise a monitoring unit which is configured to monitor correct operation of the ultraviolet irradiation unit. Among other things, consideration may be given to using suitable means to monitor the electrical properties of the ultraviolet irradiation unit, for example an interruption in the power supply circuit, a failure of the irradiation unit during operation, a short circuit or a breakage of emitter electrodes, the voltage falling below the minimum permissible mains voltage or exceeding the maximum voltage applied to the irradiation unit. Furthermore, a sensor for ultraviolet radiation could also be provided within the housing, which outputs a corresponding signal when the radiation intensity is below a predetermined threshold value.

One possibility for further processing an incorrect operation of the ultraviolet irradiation unit detected by the monitoring unit may be that the filter unit according to the invention further comprises a notification unit which is operatively coupled to the monitoring unit and is configured to output a notification when a deviation from the correct operation of the ultraviolet irradiation unit is detected. An indicator device such as a display or a mere warning light may be considered here, or alternatively or additionally an acoustic signal unit. In addition to the notification unit, data can also be output from the monitoring unit to another device, for example to a control unit of the corresponding compressor, which will be discussed further below.

Since conventional compressors generate considerable vibrations during operation, which can lead to damage to the ultraviolet irradiation unit sooner or later, especially in embodiments in which the filter unit according to the invention is in direct contact with the compressor, it can be advantageous if the ultraviolet irradiation unit is fastened inside the housing in a vibration-damped manner, in particular by means of at least one spring clip, which is preferably made at least partially from a ceramic and/or sheet metal material. Materials such as ceramic and sheet metal are preferable to less expensive plastics alternatives due to their greater resistance to ultraviolet radiation.

Alternatively or additionally, particularly in embodiments in which the filter unit according to the invention is to be arranged directly on the housing of the relevant compressor, the filter unit can comprise at least one bracket which is provided on the outside of the housing and preferably comprises at least one damping element for mechanical vibrations, for example an elastomeric damping element, wherein the bracket preferably comprises at least one permanent magnet to allow easy and tool-free fastening thereof to surfaces made of ferrous metals. Alternatively, however, other fastening means could of course also be provided, for example screws or an adhesive material.

Although radiation in the entire ultraviolet spectrum has an inactivating effect on viruses, bacteria, etc., the ultraviolet irradiation unit of the filter unit according to the invention can be configured in particular to emit ultraviolet light in the UVC range, preferably at a wavelength of about 254 nm. Lamps emitting in this wavelength range are commercially available and such radiation offers good properties in terms of its absorption in many gases and its already mentioned reflection on anodised aluminium, while also not leading to an undesirable production of ozone from oxygen, which would occur with even shorter-wave radiation.

Although the particle pre-filter can be of a wide variety of suitable types, as long as it reliably prevents dirt particles from penetrating into the housing of the filter unit according to the invention, it has been shown that particle pre-filters which are at least of filter class F7 are particularly suitable for this purpose.

A further contribution to ensuring the intended operation of the filter unit according to the invention can be to provide it with a vacuum monitoring unit which is configured to provide a notification of an excessive pressure difference between the interior and the surroundings of the housing, and which can be arranged, in particular, in the region of the particle pre-filter. Commercial vacuum monitors (monitors for pressures lower than ambient pressure) may be considered here, which, when such a pressure difference occurs that exceeds a predetermined threshold value, emits a corresponding signal which indicates that the particle pre-filter is clogged with particles that have accumulated over its service life and must be replaced.

According to a second aspect, the present invention relates to a compressor, in particular a breathing air compressor and/or multi-stage piston compressor, comprising a compressor block with at least one compressor motor and a filter unit according to the invention. Multi-stage piston compressors are known per se to a person skilled in the art and, in addition to a plurality of piston stages connected in series, usually also include cooler, drying and separator units for treating the compressed gas.

In the case described above, in which the filter unit used comprises a monitoring unit and the compressor also comprises a control unit, this can be operatively coupled to or integrated with the monitoring unit and can be configured to adapt the operation of the compressor, for example to switch off the compressor, or to open a flush valve, when a deviation from the correct operation of the ultraviolet irradiation unit is detected. In this way, the compressor can be prevented from being filled with insufficiently treated gas, wherein the use of a flush valve allows the compressor to compress the gas drawn in through the filter unit but, instead of bottling it, to simply discharge it from the compressor to the environment, and repeated switching on and off of the at least one compressor motor can be prevented if there is only a temporary problem with the ultraviolet irradiation unit.

As an alternative or in addition, the compressor could also include a timing unit which is configured to ensure a time interval between a start-up of the ultraviolet irradiation unit and of the at least one compressor motor. On the one hand, a fixed value for such a delay can be considered, which experience has shown is needed by the irradiation unit used to achieve its intended performance, or an electric or electronic circuit which is assigned to the irradiation unit and only enables a start signal for the compressor motor when the intended performance has been achieved. In this context, starting up the at least one compressor motor could also be understood to mean closing a corresponding flush valve. In any case, this measure ensures that bottling of the compressed gas only begins when the ultraviolet irradiation unit has reached its intended operating state, i.e., for example, it has gone through a warm-up phase.

Although the outlet of the filter unit could be flanged directly onto a gas inlet of the compressor block, a suction hose which is attached, preferably sealed by means of elastic material, to the outlet of the filter unit, can also be provided between the filter unit and the compressor block. In this way, flexible positioning of the filter unit can be achieved, for example the filter unit can be fastened to the housing of the compressor block via the permanent magnets already mentioned above.

Furthermore, the compressor according to the invention can comprise a safety device which is configured to ensure that the compressor can only be operated when the filter unit is in operation, for example on the basis of the monitoring unit of the filter unit described above. However, it may be advantageous if the safety device also comprises means by which operation of the compressor can exceptionally also be allowed in cases in which the filter unit is not in operation, for example if in the event of disasters the availability of the basic function of the compressor outweighs the disadvantages of the filter unit being out of operation. Such means may include a key switch or an input device for a code.

Finally, the present invention relates to a method for compressing and bottling breathing air using a compressor according to the invention, wherein the breathing air to be compressed is drawn in through the filter unit, then compressed by the at least one compressor motor and is finally bottled at a pressure of, for example, between 90 and 550 bars.

Further features and advantages of the present invention will become even clearer from the following description of an embodiment when said embodiment is considered together with the accompanying drawings. In detail, in the drawings.

Figure 1:
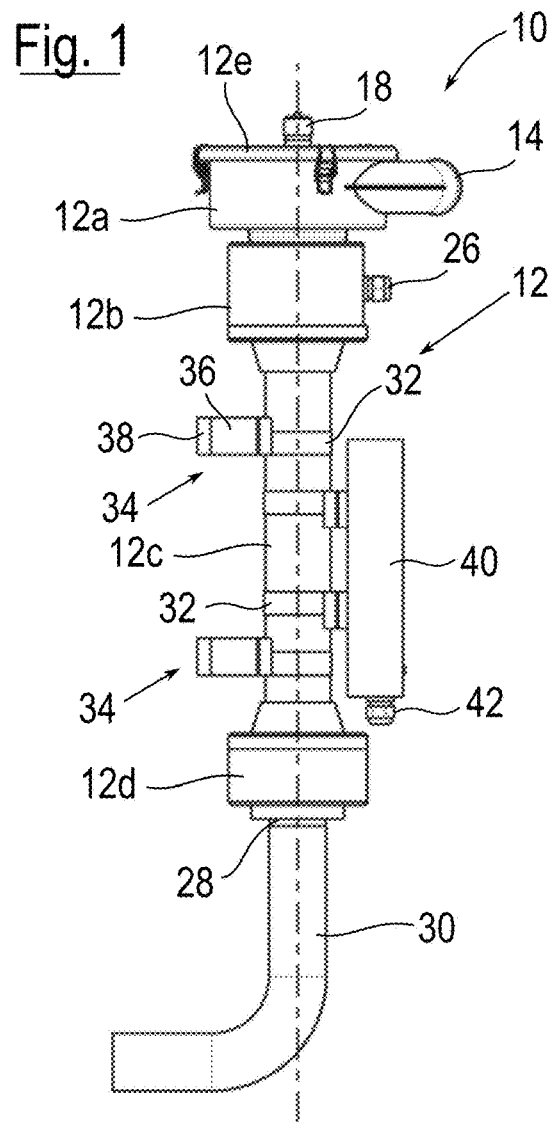
FIG. 1 shows a filter unit according to the invention in a schematic side view.
Figure 2:
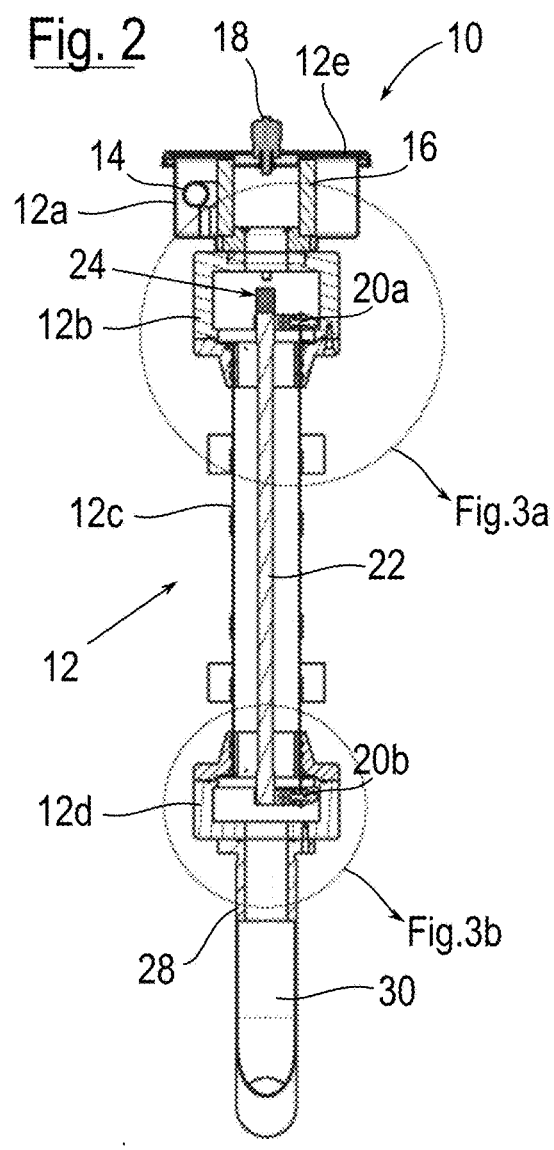
FIG. 2 shows the filter unit from FIG. 1 in a sectional view along a sectional plane AA from FIG. 1.

A filter unit according to the invention is shown in each of FIGS. 1 and 2, and is designated generally by the reference numeral 10. The filter unit 10 comprises a multi-part housing 12, which comprises an inlet 14 for gas on a first part 12a, which is at the top in the drawings and to which a suction hose can optionally be connected. The individual parts of the multi-part housing 12 described below are each firmly connected to one another, for example riveted, screwed, welded or the like, wherein in some embodiments it is also possible for several of the parts of the housing 12 to be formed in one piece with one another.

A chamber in this first part 12a of the housing 12 accommodates a filter material which forms an annular particle pre-filter 16 through which the gas flowing in through the inlet 14 passes before it enters the actual interior of the housing 12. Also assigned to the first part 12a of the housing 12, the filter unit 10 comprises a vacuum monitoring unit 18 for indicating a possible blockage of the particle pre-filter 16. Since the first part 12a of the housing 12 is closed at its top by a releasably clamped and sealed cap 12e, an openable access to the interior of the housing 12 can be provided at this point, through which the filter material of the particle pre-filter 16 can be removed and replaced, for example at regular intervals.

Figure 3A:
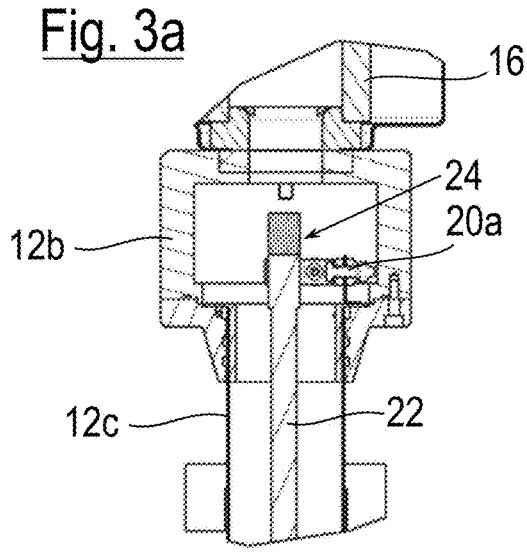
FIGS. 3a and 3b show enlarged detailed views of two areas from FIG. 2.

Below the first part 12a is a second part 12b of the housing 12, which is shown again in FIG. 3a in an enlarged detailed view and in which a first fastening element 20a for a rod-shaped ultraviolet irradiation unit 22 is arranged, which can be inserted and replaced by unscrewing and removing the second part 12b, which is screwed onto the third part 12c of the housing 12 described below by means of a thread (not shown). The irradiation unit 22 can be designed, for example, as a fluorescent tube for ultraviolet light with a wavelength of approximately 254 nm, by means of which any viruses, bacteria, spores, etc. present in the gas flowing inside the housing can be inactivated or killed.

In the embodiment shown, the first fastening element 20a is formed by a spring clip which holds the irradiation unit 22 in a vibration-damped manner, wherein a socket 24 for the electrical supply of the irradiation unit 22 is detachably fitted onto it from above. There is also a screwed cable connection 26 on the outside of the second part 12b of the housing 12, to which a power cable for supplying the ultraviolet irradiation unit can be fastened, wherein an electrical connection (not shown in the drawings) between the screwed cable connection 26 and the socket 24 is provided within the second part 12b of the housing 12.

Figure 3B:
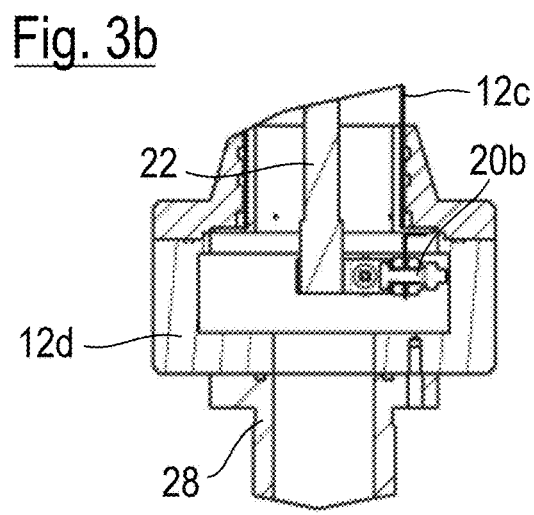

From the first fastening element 20a, the irradiation unit 22 extends through a third part 12c of the housing 12 to a fourth part 12d, in which it is held in an analogous manner by a second fastening element 20b, which is also shown in FIG. 3b in an enlarged detailed view. Here, the third part 12c of the housing 12 is made of anodised aluminium, since this material reflects ultraviolet light of the said wavelength and thus both increases the efficiency of the device and counteracts excessive heating thereof. The other parts of the housing 12 can also be made of aluminium or of another material, for example stainless steel, since they are much less exposed to the radiation of the irradiation unit 22.

Finally, on the underside of the fourth part 12d of the housing 12 there is attached a flange-shaped outlet 28, to which a suction hose 30 through which the irradiated gas can be supplied to a compressor block 402 (shown in FIG. 4) is fastened in the configuration shown in the drawings. It should be noted that in the region of the third and fourth parts 12c, 12d of the housing 12 and of the outlet 28 no further accesses to the interior of the housing 12 are provided, so that on this side of the filter unit 10 on which the gas has already been irradiated and is therefore in a state ready for compression and finally bottling, no complex measures have to be taken to seal the housing 12 and at the same time critical contamination of the treated gas can be reliably ruled out.

Figure 4:
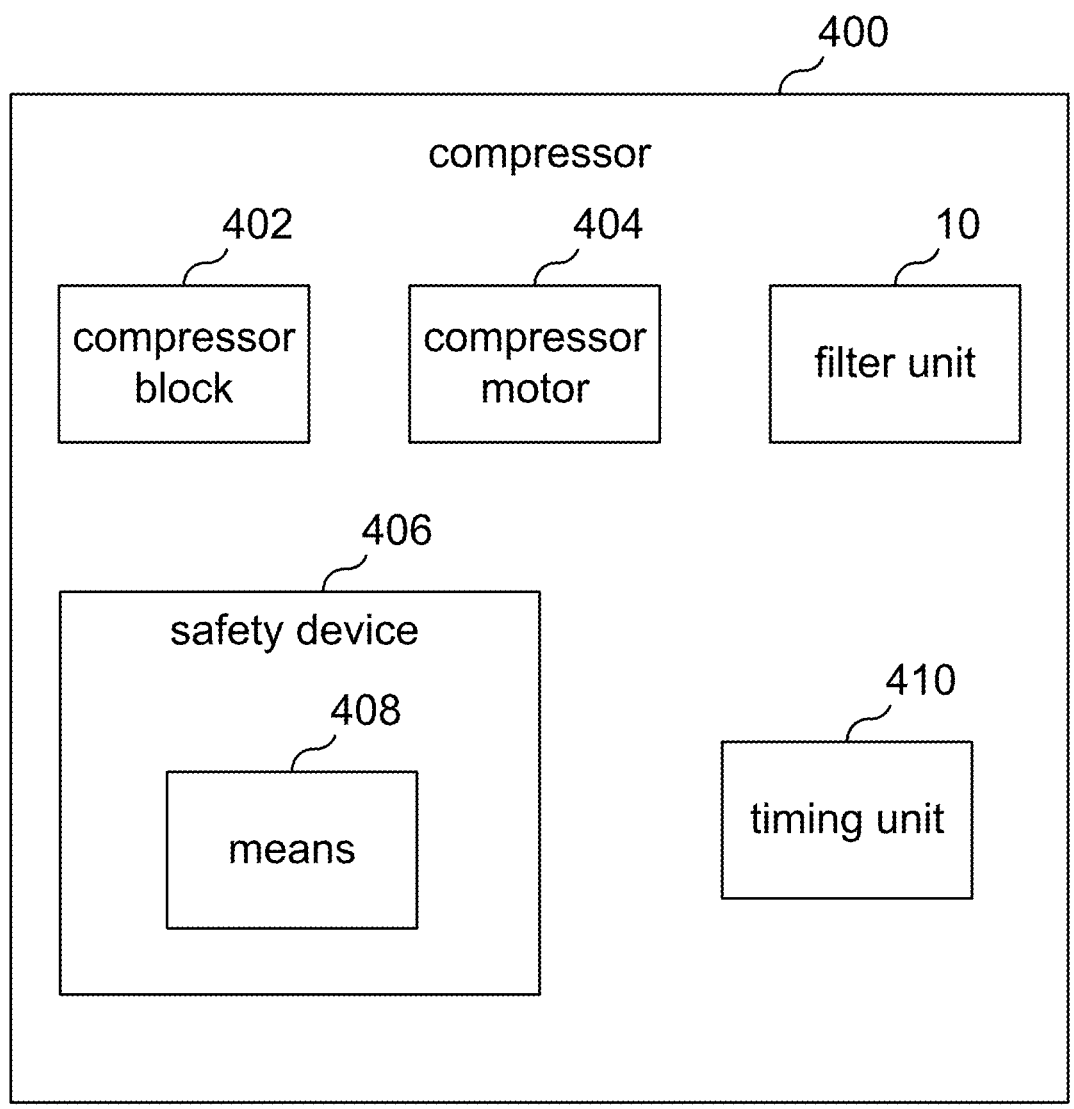
FIG. 4 shows a compressor.

Furthermore, it should be noted that on the outside of the housing 12, in particular in the region of the third part 12c thereof, two brackets 34 are mounted by means of mounting clamps 32, which each comprise an elastomeric damping element 36 and a permanent magnet 38 and by means of which the filter device 10 can be mounted on a surface made of a ferrous metal, for example an outside of the compressor 400 (shown in FIG. 4). Together with the fastening elements 20a and 20b mentioned above, the damping elements 36 serve to decouple the filter device 10 and in particular the ultraviolet irradiation unit 22 from the vibrations and shocks occurring during operation of the compressor block 402.

Furthermore, a ballast 40 in the form of a switch box is mounted on the housing 12 in a similar manner by two mounting clamps 32, and undertakes all the control tasks necessary for the operation of the filter unit 10 and in particular the ultraviolet irradiation unit, as well as the electrical supply via a further screwed cable connection 42 and a cable (not shown). The ballast 40 itself is fed from the mains via a connection (not shown), so that the filter unit 10 can be operated autonomously apart from this. The ballast 40 can also be operatively coupled to further electronic components which are to be provided optionally and are not shown here, such as sensors for the ambient temperature or the temperature of the gas drawn into the filter unit 10, a monitoring unit for the function of the ultraviolet irradiation unit, a notification unit for a user and/or a control unit of the compressor block 402.

As shown in FIG. 4, the compressor 400 may comprise the compressor block 402, at least one compressor motor 404, and the filter unit 10. As shown in FIG. 4, the compressor 400 can comprise a safety device 406 which is configured to ensure that the compressor 400 can only be operated when the filter unit 10 is in operation. However, it may be advantageous if the safety device 406 also comprises means 408 by which operation of the compressor can exceptionally also be allowed in cases in which the filter unit 10 is not in operation, for example if in the event of disasters the availability of the basic function of the compressor 400 outweighs the disadvantages of the filter unit 10 being out of operation. Such means 408 may include a key switch or an input device for a code. As shown in FIG. 4, the compressor 400 could include a timing unit 410 which is configured to ensure a time interval between a start-up of the ultraviolet irradiation unit 22 and of the at least one compressor motor 404.

The invention claimed is:

1. A compressor comprising a compressor block, at least one compressor motor, a safety device, and a filter unit, wherein the filter unit comprises:
   a housing having an inlet and an outlet for gas to be compressed;
   a particle pre-filter arranged downstream of the inlet in the flow direction of the gas to be compressed;
   an ultraviolet irradiation unit which is arranged downstream of the particle pre-filter in the flow direction of the gas to be compressed and is configured to emit ultraviolet light; and
   a ballast configured and arranged to control the ultraviolet irradiation unit;
   wherein the filter unit is designed in such a way that gas to be compressed, which is fed in at the inlet, first passes through the particle pre-filter, is then irradiated by the ultraviolet irradiation unit, and is then fed to the compressor through the outlet; and
   wherein the safety device is configured to prevent operation of the compressor when the filter unit is not in operation, and the safety device comprises means capable of disabling the compressor operation prevention and allowing operation of the compressor when the filter unit is not in operation.

2. The compressor according to claim 1, in which the housing of the filter unit in the area of the ultraviolet irradiation unit is made at least partially of anodised aluminium.

3. The compressor according to claim 1, wherein the housing of the filter unit is elongate in the region of the ultraviolet irradiation unit of the filter unit.

4. The compressor of claim 3, wherein the housing of the filter unit is cylindrical in the region of the ultraviolet irradiation unit.

5. The compressor according to claim 1, wherein the ballast of the filter unit is further configured to adapt the control of the ultraviolet irradiation unit of the filter unit to an ambient temperature and/or a temperature of the gas to be compressed.

6. The compressor according to claim 1, wherein the filter unit further comprises a monitoring unit which is configured to monitor correct operation of the ultraviolet irradiation unit of the filter unit.

7. The compressor according to claim 6, wherein the filter unit further comprises a notification unit which is operatively coupled to the monitoring unit and is configured to output a notification when a deviation from the correct operation of the ultraviolet irradiation unit of the filter unit is detected.

8. The compressor according to claim 1, wherein the ultraviolet irradiation unit of the filter unit is fastened inside the housing of the filter unit in a vibration-damped manner.

9. The compressor of claim 8, wherein at least one spring clip fastens the ultraviolet irradiation unit inside the housing in the vibration damped manner.

10. The compressor according to claim 1, wherein the filter unit further comprises at least one bracket which is provided on the outside of the housing of the filter unit.

11. The compressor of claim 10, wherein the at least one bracket comprises at least one damping element for mechanical vibrations.

12. The compressor according to claim 1, wherein the ultraviolet irradiation unit of the filter unit is configured to emit ultraviolet light in the UVC range.

13. The compressor according to claim 1, wherein the particle pre-filter of the filter unit is at least of filter class F7.

14. The compressor according to claim 1, wherein the filter unit further comprises a vacuum monitoring unit which is configured to provide a notification of an excessive pressure difference between the interior and the surroundings of the housing of the filter unit.

15. The compressor of claim 14, wherein the vacuum monitoring unit of the filter unit is arranged in the region of the particle pre-filter.

16. The compressor according to claim 1, wherein the filter unit further comprises:
   a monitoring unit which is configured to monitor correct operation of the ultraviolet irradiation unit; and
   a control unit which is operatively coupled to or integrated with the monitoring unit and is configured to adapt the operation of the compressor when a deviation from the correct operation of the ultraviolet irradiation unit is detected.

17. The compressor according to claim 1, further comprising a timing unit which is configured to ensure a time interval between a start-up of the ultraviolet irradiation unit and of the at least one compressor motor.

18. The compressor according to claim 1, wherein a suction hose, which is attached to the outlet of the filter unit, is provided between the filter unit and the compressor block.

19. A method for compressing breathing air using the compressor according to claim 1, wherein the breathing air to be compressed is drawn in through the filter unit, then compressed by the at least one compressor motor, and finally bottled.

20. The compressor of claim 1, wherein the means capable of disabling the safety device comprises a key switch or an input device for a code.

* * * * *